United States Patent
Raj et al.

(10) Patent No.: US 6,406,193 B1
(45) Date of Patent: Jun. 18, 2002

(54) FIBER OPTIC CONNECTOR SYSTEM

(75) Inventors: Kannan Raj, Chandler; Roland M. Morley, Tempe, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/609,875

(22) Filed: Jul. 5, 2000

(51) Int. Cl.[7] .................................................. G02B 6/38

(52) U.S. Cl. ................................... 385/73; 385/31

(58) Field of Search ............................... 385/73, 74, 31, 385/33, 47

(56) References Cited

U.S. PATENT DOCUMENTS

| | | | | |
|---|---|---|---|---|
| 4,923,270 A | * | 5/1990 | Carter | 359/127 |
| 5,191,467 A | * | 3/1993 | Kapany et al. | 359/337 |
| 5,408,552 A | * | 4/1995 | Devenport et al. | 385/31 |
| 5,500,914 A | * | 3/1996 | Foley et al. | 385/77 |
| 6,009,219 A | * | 12/1999 | Doyle | 385/23 |

* cited by examiner

Primary Examiner—Tulsidas Patel
(74) Attorney, Agent, or Firm—Trop, Pruner & Hu, P.C.

(57) ABSTRACT

A fiber optic connector system may include a elliptical reflector arranged to couple light from one optical fiber to another. The elliptical reflector has two foci, one of which may correspond to an end of a first optical fiber and the other of which may correspond to an end of another optical fiber. Thus, light emitted from one fiber may be coupled to another fiber.

21 Claims, 5 Drawing Sheets

FIBER OPTIC CONNECTOR SYSTEM

BACKGROUND

This invention relates generally to optical fibers and to coupling or connecting those fibers.

As used herein, a fiber optic connector or splice optically couples one optical fiber, optical source or optical detector to another optical fiber, optical source or optical detector. Therefore, light transmitted through one optical fiber is conveyed to another optical fiber. A fiber optic coupler is a device that performs distribution of light from one fiber into at least two other fibers or which couples light from several fibers into one fiber. Thus, a fiber optic coupler is also a fiber optic connector.

A fiber optic connector may align optical fibers optically and secure the fibers in the connector or splice. Most connectors use a ferrule to align the fibers. In general, a ferrule is a tube with a central passage which receives the fiber for connection. The fiber may be held within the ferrule using epoxy or epoxyless connectors. An internal insert, for example, may grip the fiber providing the stability and tensile strength of epoxy. As the connector is crimped, the insert is compressed around the fiber.

In some cases, different connectors must be utilized for different circumstances. For example, with fibers that are multi-mode, some particular types of connectors are utilized. Other connectors may necessary when the fibers are single mode fibers. Moreover, in some cases, connectors may not achieve self-aligned fiber-to-fiber coupling between the coupled fibers. In some cases, good alignment tolerances may be difficult to achieve.

In addition, simple end-to-end coupling techniques may not be amenable to use in multiplexers and de-multiplexers with a plurality of input or output fibers. Because of the end-to-end arrangement, there is no easy way to use the same connector as a coupler for multiple fibers.

Thus, there is a need for a better way to connect or couple optical fibers.

DETAILED DESCRIPTION

Figure 1:
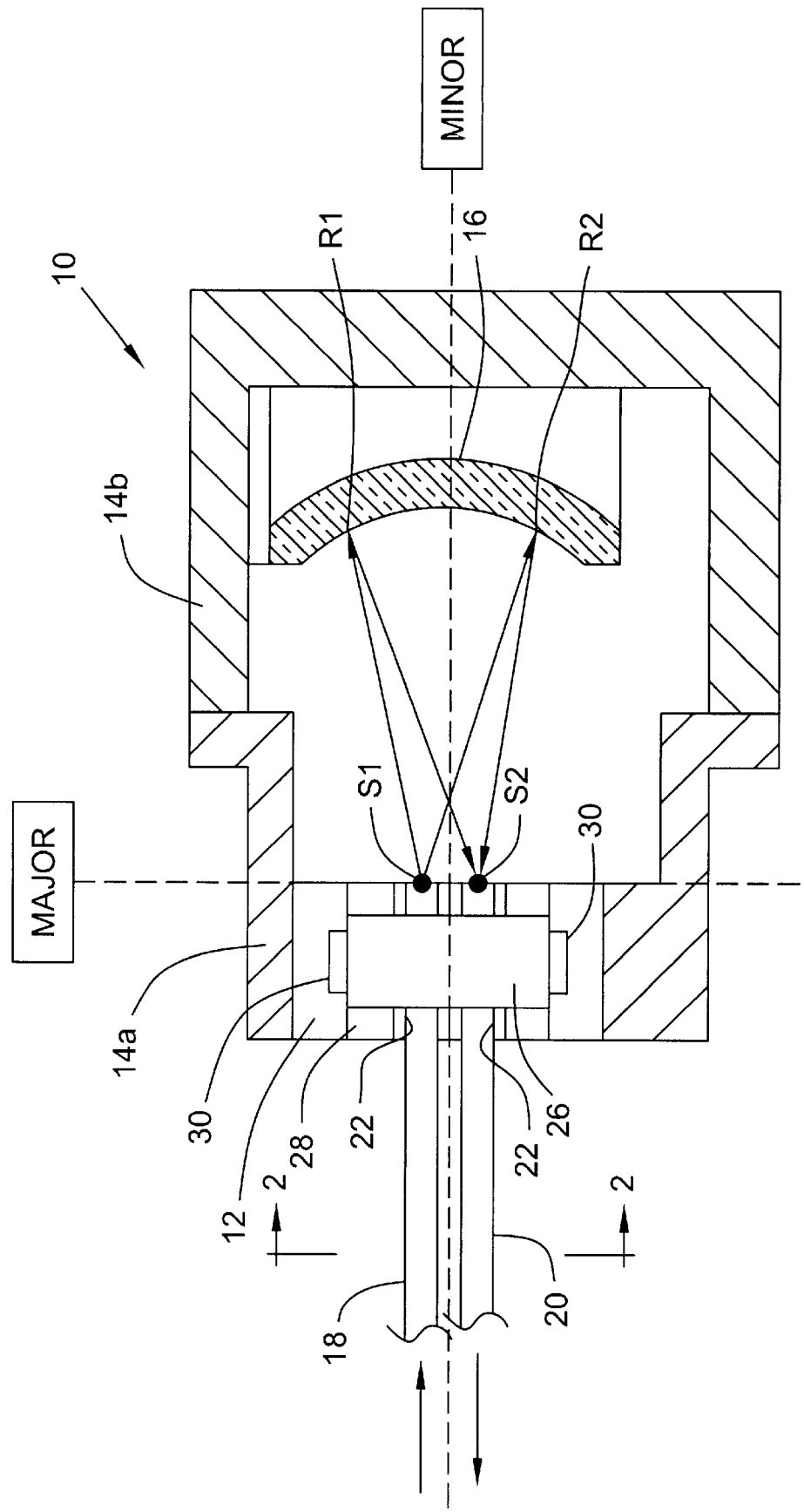
FIG. 1 is a partial top plan view of one embodiment of the present invention.

Referring to FIG. 1, a pair of optical fibers 18 and 20 may be coupled by positioning their ends, indicated at S1 and S2, at the conjugate foci of an elliptical or ellipsoid reflector 16 in an optical connector 10. An input optical fiber 18 may abut an optical mount 14 at the point Si. An output optical fiber 20 may abut the mount 14 at the point S2. A reflector 16 is positioned about on the opposing side of the optical mount 14.

The points S1 and S2 lie at the conjugate foci of the elliptical reflector 16. Light emitted from the focus S1 is reflected at points R1 or R2 on the reflector 16 is focused at the focus S2 at the end of the fiber 20. Thus, if optical fibers 18 and 20, with matching numerical apertures, are each positioned at one of the foci S1 or S2 of the elliptical reflector 16, any cone of rays exiting one fiber located at the focus S1 is imaged onto the other fiber located at the focus S2.

Figure 2:
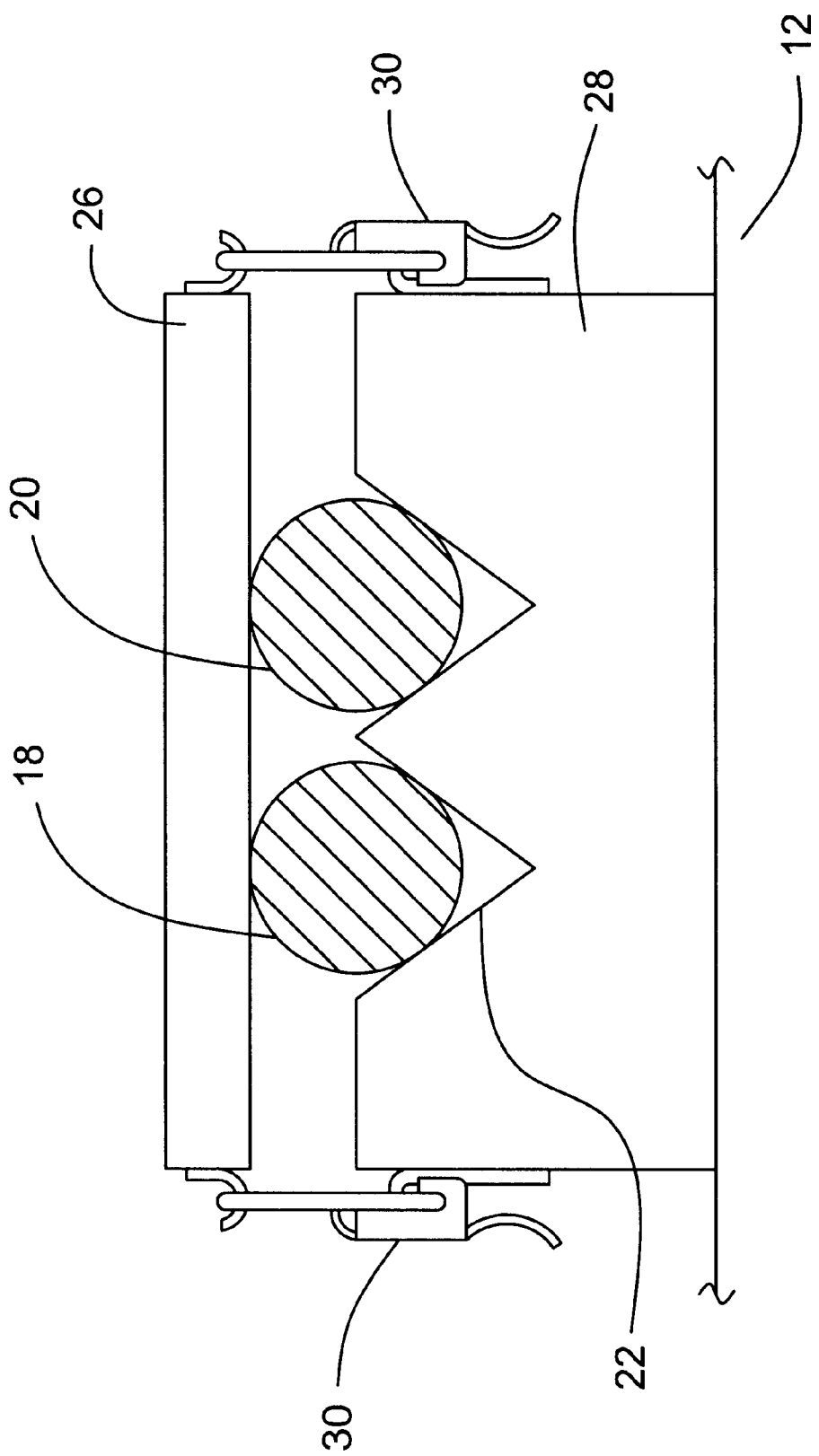
FIG. 2 is an enlarged cross-sectional view taken generally along the line 2—2 of FIG. 1.

The optical mount 14 may hold the elliptical reflector 16, and a securement system including a securement device 30 for each optical fiber 18 or 20. As shown in FIG. 2, a top plate 26 is clamped to the support 12 by a pair of securement devices 30 that may be clamps for example. Each device 30 engages the top plate 26 and pulls it downwardly causing an optical fiber 18 or 20 to be sandwiched between the top plate 26 and the support 12 in a V-shaped groove 22.

The V-shaped groove 22 may be etched into the surface of a substrate 28 that may be made of silicon or thermoplastic material, as examples. The x and y alignment of the fibers 18 or 20 is controlled by placing a fiber 18 or 20 on the V-shaped groove 22. The V-shaped groove 22 is centered in alignment with the foci S1 or S2 of the reflector 16. The height of the V-shaped groove 22 is compatible with the diameter of the optical fiber 18 or 20 to be coupled. When a fiber 18 or 20 is positioned in the V-shaped groove 22, the cores of the input and output fibers 18 and 20 are at the same elevation.

The optical mount 14 provides accurate location of the input fibers and output fibers at their respective foci S1 and S2. Additionally, the reflector 16 is held by the optical mount 14 so that the major axis of the reflector 16 is coincident with the fiber optic input and output facets, and the minor axis is perpendicular to the midpoint of S1 and S2. The mount 14 may include a pair of mating halves 14a and 14b.

In the connector 10, shown in FIG. 1, the input and output fibers 18 and 20 are on the same side of the connector 10. The elliptical reflector 16 may be a reflective ellipsoid or conic section placed on one side of the optical mount 14. The reflector 16 may be secured with epoxy around its edges to the mount 14. The elliptical reflector 16 may be made by replication of a diamond turned master or by injection molding to manufacture in high volumes. Aluminum, silver, or gold coating may be applied to the reflector 16 to create a highly reflecting surface.

While a fixed positioning of the elliptical reflector 16 is illustrated in FIG. 1, the reflector 16 may be adjustable for precise arrangement of the reflector 16 with respect to the foci S1 and S2. In addition, in an embodiment in which the connector 10 is a coupler, the reflector 16 may be rotated to change the positioning of the foci S1 or S2 to distribute input light to more than one output fiber 20.

Figure 3:
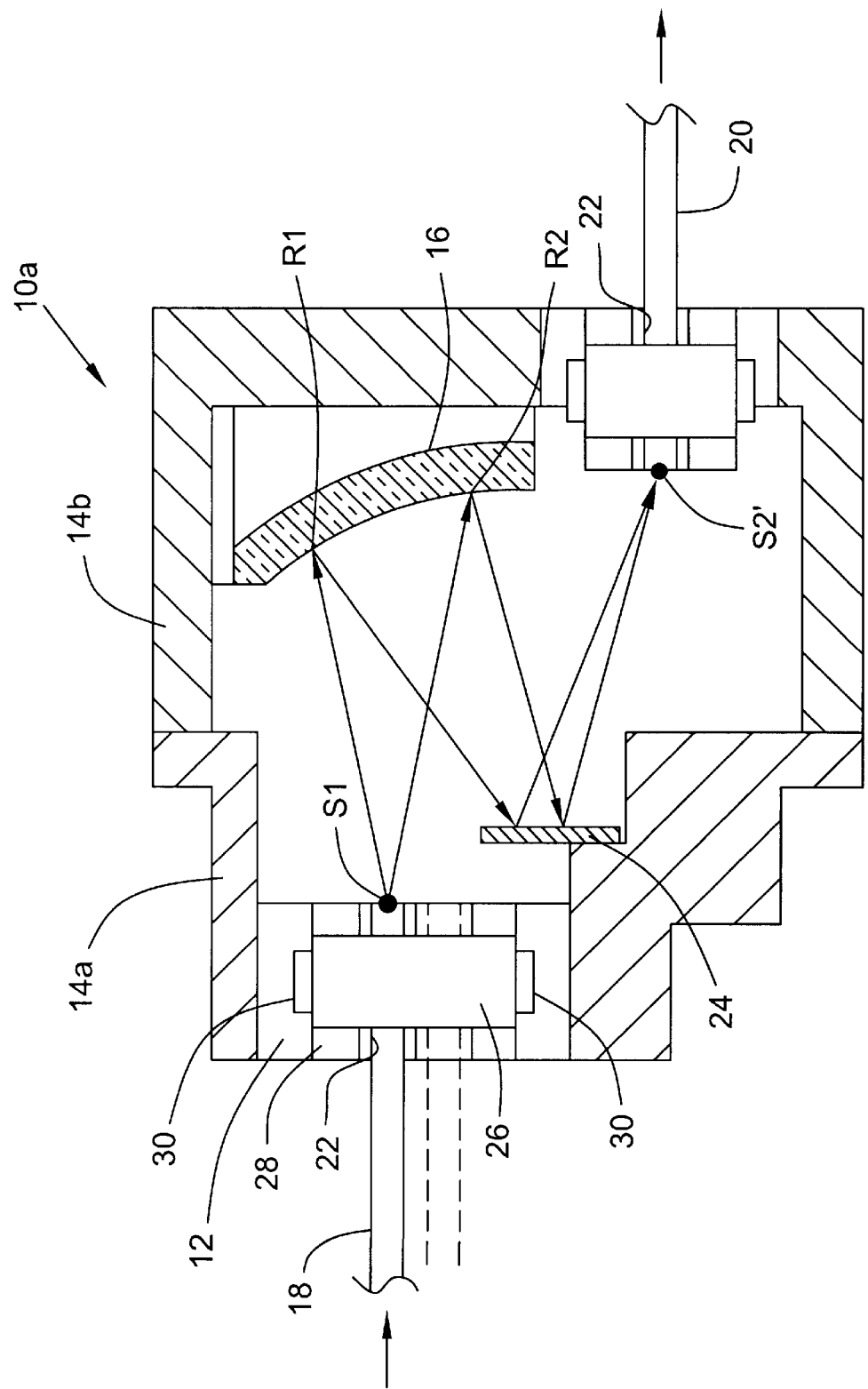
FIG. 3 is a partial top plan view of another embodiment of the present invention.

In an alternative embodiment, shown in FIG. 3, a connector 10a includes a pair of optical fibers 18 and 20 that are provided on opposite sides of a connector 10a. The output fiber 20 may be oriented at 180 degrees to the input fiber 18. Similar deflecting systems may be provided to orient the fiber 20 at any desired angle with respect to the fiber 18 so that the receiving cone of the fiber 20 matches the numerical aperture of the fiber 18.

A planar, highly reflective surface 24 provides the reflection to redirect the rays from the focus S2 to the translated foci S2'. The surface of the reflector 24 may be made of aluminum, gold or silver to be highly reflective. The focus S2 that would have been associated with a fiber shown in dashed lines, may be redirected to the position S2' by the intervention of the reflector 24. Except for the orientation of the fibers 18 and 20 with respect to one another, the connector 10a works in the same fashion as described previously with respect to the connector 10.

Advantageously, the reflective surface of the reflector 16 is highly reflective to minimize losses. Fiber separation may be controlled precisely for 1:1 imaging. Again, the numerical apertures of the fibers 18 and 20 are advantageously matched.

In the connectors 10 and 10a shown in FIGS. 1 through 3, self-aligned fiber-to-fiber coupling may be achieved due to 1:1 imaging from the reflector 16. Low to moderate cost may be achieved in some embodiments due to the fact that the pieces needed to produce the connector 10 or 10a can be mass-produced. Imaging conditions are achromatic. Good alignment tolerances may be readily achieved. The same connector 10 or 10a may be used in single mode, and multi-mode fibers. The stringent alignment tolerances of single mode system may be accommodated.

Figure 4:
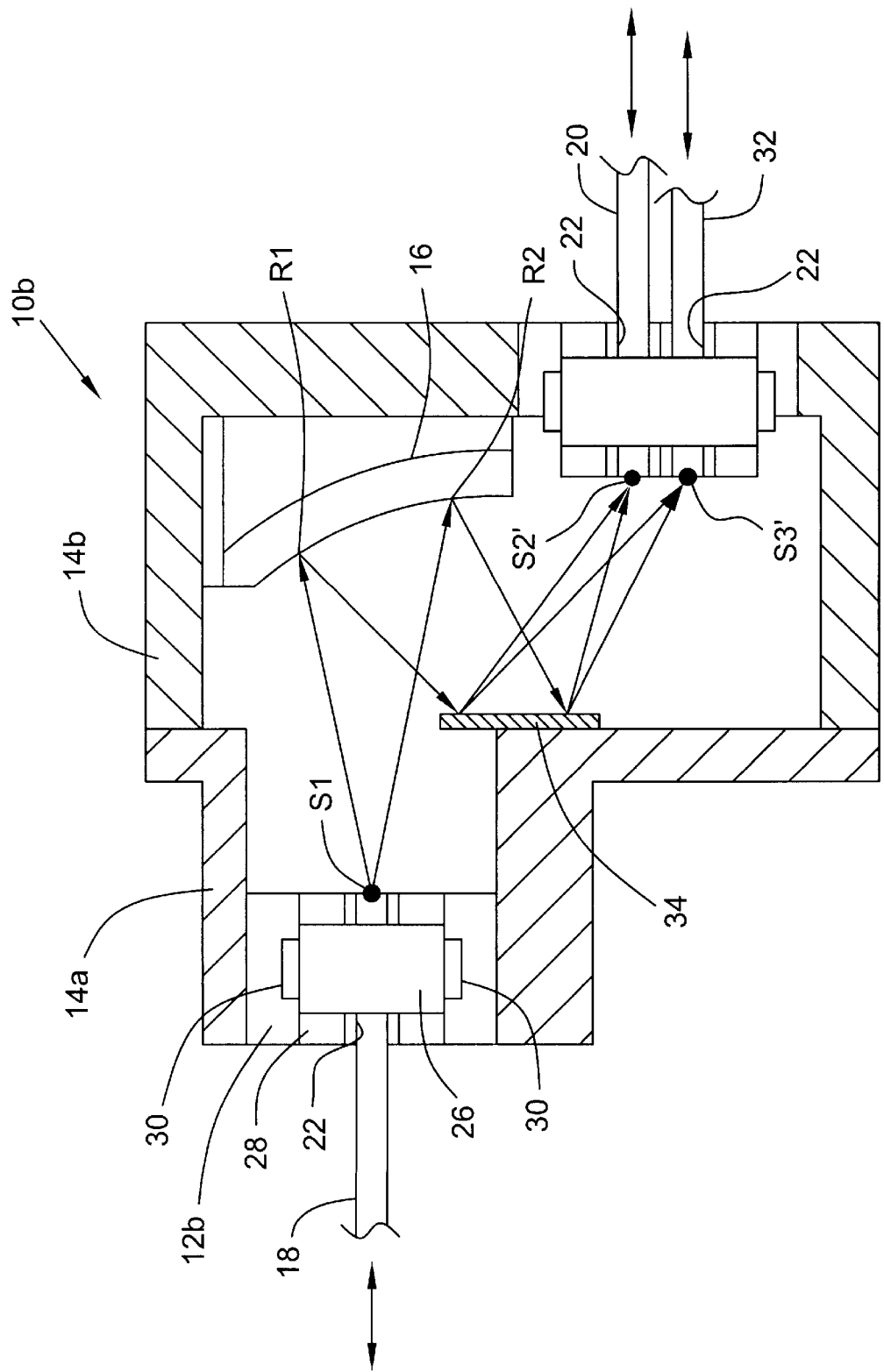
FIG. 4 is a partial top plan view of still another embodiment of the present invention.

A coupler 10b, shown in FIG. 4, may receive an input on the optical fiber 18 and provide an output on the optical fibers 20 and 32 in accordance with one embodiment of the present invention. Of course, the number of output fibers may be any desired number. Similarly, input signals may be provided on the optical fibers 20 and 32 and an output may be provided on the optical fiber 18.

Light incident through the focus S1 is reflected by the elliptical reflector 16 onto a dispersive element 34. The dispersive element 34 focuses the incident light on two spaced foci S2' and S3' each associated with an end of one of the optical fibers 20 and 32. The dispersive element 34, that may be a reflective grating or a prism, creates or contributes to the creation of multiple foci.

In some embodiments, the dispersive element 34 may produce more than two foci as mentioned previously. In addition, the dispersive element 34 may work in both directions. Thus, if light is incident on the fiber 18, the element 34 works as illustrated in FIG. 4. However, if light is incident through the optical fibers 20 and 32, the element 34 focuses both light sources on the focus S1. Thus, the coupler lob is bi-directional.

The equation shown below governs the choice of the one dimensional grating pitch, angle of incidence, and angle of diffraction and the spacing between the output and input optical fibers in an embodiment in which the element 34 is a reflective grating:

$$m\lambda = d[\sin \Theta_i - \sin \Theta_o]$$

where m is the order of diffraction, d is the grating period, $\Theta_i$ is the angle of incidence normal to the surface of the reflective grating and $\Theta_o$ is the diffracted output angle with respect to normal. The order of diffraction may be plus one or minus one or higher orders.

Normally, couplers such as the coupler 10b used for wavelength division multiplexing operate in the wavelength from fifteen hundred thirty nanometers to fifteen hundred sixty-five nanometers. The channel spacing is generally one hundred gigahertz. Four, eight, sixteen or thirty-two channels may be located on the one hundred gigahertz channel grid.

The other components of the coupler lob are as described previously in connection with FIGS. 1–3. Instead of simply clamping one fiber, one securement device 30 may be utilized to clamp two or more fibers on a substrate 28.

The coupler lob may be utilized as a multiplexer $10b_1$ and a de-multiplexer $10b_2$ of a wavelength division multiplexer (WDM) system. Multiplexers are devices which are able to launch, on the same optical fiber, two or more signals with different wavelengths that are then separated at the output end of the fiber by a de-multiplexer. The multiplexers and de-multiplexers are reciprocal devices. That is, the same coupler can be utilized as either a multiplexer (N:1) or de-multiplexer (1:N). The only difference between a coupler used as a de-multiplexer and a coupler used as a multiplexer may be the performance required for isolation.

Figure 5:
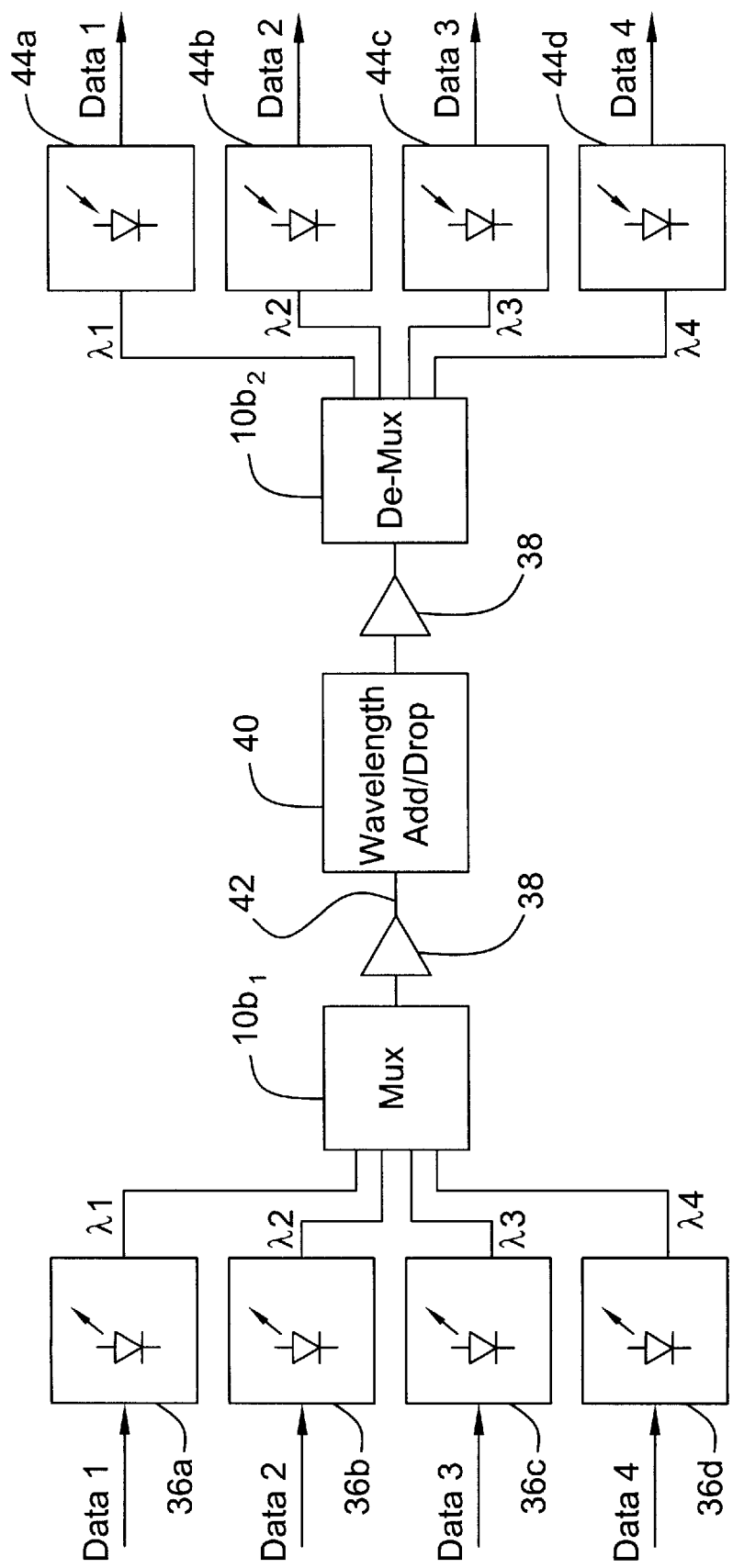
FIG. 5 is a mount diagram of a system in accordance with one embodiment of the present invention.

For example, a four channel WDM system may use a WDM multiplexer that combines four independent data streams, each of a unique wavelength generated by one of the four generators 36 shown in FIG. 5. The WDM multiplexer $10b_1$ creates four output data channels over a single line 42. Each channel carries light of a different wavelength $\lambda 1-\lambda 4$. The erbium-doped fiber amplifier 38 compensates for fiber losses. A wavelength addition or dropping unit 40 may be situated on the line 42 together with an additional preamplifier 38. The unit 40 allows a channel to be added or removed. The de-multiplexer $10b_2$ at the fiber receiving end separates out the four data streams $\lambda 1-\lambda 4$ on the single line 42. The light detectors 44 may convert light energy into electrical signals.

Thus, by allowing multiple WDM channels to coexist on a single fiber, one can tap into the huge fiber bandwidth with data rates exceeding several tens of gigabits per second. Embodiments of the present invention may implement a passive reflective coupler. The use of a passive reflective coupler may obviate the need for fused fiber coupling designs or two by two cascaded fiber coupling designs. The latter two designs may have a larger insertion loss. Assembly, in some embodiments of the present invention, may be simple with only three major pieces, the fibers on the V-shaped grooves 22, the optical mount with the and the elliptical reflector 16. Alignment features or marks may be provided on the optical mount 14 and the V-shaped groove 22 for automated assembly. The elliptical reflector's focal length and dispersive element power may be designed such that the output angles match standard fiber pitches.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of connecting optical fibers comprising:
   arranging a pair of optical fibers, each with one end proximate to one of two foci of an elliptical reflector;
   causing light emitted from one of said optical fibers to be reflected by said elliptical reflector to a planar reflector and from the planar reflector to an end of the other of said optical fibers; and
   dispersing light reflected by said elliptical reflector to form two foci from said light reflected from said elliptical reflector.

2. The method of claim 1 including securing each of said optical fibers on a mount.

3. The method of claim 2 including clamping each of said fibers onto said mount.

4. The method of claim 3 including clamping each of said fibers into a V-shaped groove in said mount.

5. The method of claim 1 including aligning each of said fiber ends with said foci of said elliptical reflector.

6. The method of claim 1 including reflecting light reflected by said elliptical reflector to reposition one of the foci of said elliptical reflector.

7. The method of claim 6 including reflecting the light reflected by said elliptical reflector to position the foci on opposite sides of said elliptical reflector.

8. The method of claim 1 including positioning an optical fiber at each of said foci formed from the dispersed light reflected from said elliptical reflector.

9. The method of claim 8 including reflecting said light from a grating after causing the light to reflect from said elliptical reflector.

10. The method of claim 1 including coupling light received from a first optical fiber and reflected by said elliptical reflector to at least two optical fibers.

11. The method of claim 1 including coupling light received from at least two optical fibers to said elliptical reflector and focusing said light from said elliptical reflector on a single optical fiber.

12. The method of claim 1 including multiplexing light from a plurality of light generators each of a different wavelength, transmitting a combined light signal over a line to a demultiplexer and demultiplexing said light into a plurality of signals of different wavelengths.

13. A fiber optic connector comprising:

a device to receive an input fiber and an output fiber;

an elliptical reflector, secured to said device, to couple light from said input fiber to said output fiber;

a planar reflector between said elliptical reflector and said output fiber to divert light from said elliptical reflector to said output fiber;

a securement device to secure at least three fibers on said device; and a disbursive element to disperse light reflected by said elliptical reflector and to form two foci.

14. The connector of claim 13 wherein said device includes clamps, each clamp to clamp an optical fiber.

15. The connector of claim 14 wherein said device includes a V-shaped groove to receive an optical fiber.

16. The connector of claim 13 wherein said device includes an optical mount, said optical mount positioned to act as a stop for the end of an optical fiber secured by said device.

17. The connector of claim 13 wherein said device has two opposed sides, said connector including a pair of clamps on the same side of said device.

18. The connector of claim 13 wherein said device has two opposed sides, said connector including a pair of clamps each on one of the opposite sides of said device.

19. The connector of claim 13 including an optical mount arranged to form a stop for at least three optical fibers, the optical mount arranged to position the ends of said optical fibers at the three foci formed by the combination of said elliptical reflector and said dispersive element.

20. The connector of claim 13 wherein said dispersive element is a reflective grating.

21. A method of connecting optical fibers comprising:

arranging a pair of optical fibers, each with an end proximate to one of two foci of an elliptical reflector;

causing light emitted from one of said optical fibers to be reflected by said elliptical reflector to a planar reflector and from the planar reflector to the end of the other of said optical fibers;

multiplexing light from a plurality of light generators, each of a different wavelength;

transmitting a combined light signal over a line to a demultiplexer; and demultiplexing said light into a plurality of signals of different wavelengths.

* * * * *